United States Patent
Liu et al.

(10) Patent No.: US 12,307,101 B1
(45) Date of Patent: May 20, 2025

(54) MEMORY MANAGEMENT METHOD, MEMORY STORAGE APPARATUS AND MEMORY CONTROL CIRCUIT UNIT

(71) Applicant: PHISON ELECTRONICS CORP., Miaoli (TW)

(72) Inventors: Yu-Heng Liu, Hsinchu County (TW); Yu-Siang Yang, New Taipei (TW); Yao-Hsuan Li, Hsinchu County (TW); An-Cheng Liu, Taipei (TW); Wei Lin, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 18/605,832

(22) Filed: Mar. 15, 2024

(30) Foreign Application Priority Data

Feb. 22, 2024 (TW) ................. 113106267

(51) Int. Cl.
*G06F 3/06* (2006.01)
(52) U.S. Cl.
CPC .......... *G06F 3/0619* (2013.01); *G06F 3/0659* (2013.01); *G06F 3/0679* (2013.01)
(58) Field of Classification Search
CPC ..... G06F 3/0619; G06F 3/0659; G06F 6/0679
See application file for complete search history.

(56) References Cited

U.S. PATENT DOCUMENTS

| | | | |
|---|---|---|---|
| 2016/0303635 A1* | 10/2016 | Branagan | C21D 8/0236 |
| 2021/0306010 A1* | 9/2021 | Lin | H03M 13/23 |
| 2022/0107756 A1* | 4/2022 | Zeng | G06F 3/0604 |
| 2023/0068482 A1 | 3/2023 | Ning et al. | |
| 2024/0152296 A1* | 5/2024 | Liu | G06F 3/0679 |
| 2024/0201437 A1* | 6/2024 | Winterbottom | G06N 3/067 |
| 2024/0201857 A1* | 6/2024 | Su | G06F 3/0653 |
| 2024/0249778 A1* | 7/2024 | Chen | G06F 11/1068 |
| 2024/0385776 A1* | 11/2024 | Lee | G06F 3/0659 |

OTHER PUBLICATIONS

"Office Action of Taiwan Counterpart Application", issued on Oct. 22, 2024, p. 1-p. 5.

* cited by examiner

*Primary Examiner* — Hiep T Nguyen
(74) *Attorney, Agent, or Firm* — JCIPRNET

(57) ABSTRACT

A memory management method, a memory storage apparatus and a memory control circuit unit are disclosed. The method includes: sending a plurality of read command sequences including a first read command sequence and a second read command sequence, and the first read command sequence is configured to instruct a performing of a first read operation on a first physical unit of a rewritable non-volatile memory module, and the second read command sequence is configured to instruct a performing of a second read operation on the first physical unit; determining a system parameter according to a time interval between a first read time point corresponding to the first read operation and a second read time point corresponding to the second read operation; and instructing the rewritable non-volatile memory module to perform a specific operation according to the system parameter.

18 Claims, 6 Drawing Sheets

| serial number | read count | last read time | average read time interval |
|---|---|---|---|
| 1 | C(1) | T(1) | TAVG(1) |
| 2 | C(2) | T(2) | TAVG(2) |
| ⋮ | ⋮ | ⋮ | ⋮ |
| n | C(n) | T(n) | TAVG(n) |
| ⋮ | ⋮ | ⋮ | ⋮ |

FIG. 7

| average read time interval TAVG | 1 | 2 | ⋯ | m |
|---|---|---|---|---|
| S1 | S1(1) | S1(2) | ⋯ | S1(m) |
| S2 | S2(1) | S2(2) | ⋯ | S2(m) |

FIG. 8

MEMORY MANAGEMENT METHOD, MEMORY STORAGE APPARATUS AND MEMORY CONTROL CIRCUIT UNIT

CROSS-REFERENCE TO RELATED APPLICATION

This application claims the priority benefit of Taiwan application serial no. 113106267, filed on Feb. 22, 2024. The entirety of the above-mentioned patent application is hereby incorporated by reference herein and made a part of this specification.

BACKGROUND

Technical Field

The present disclosure relates to a memory management method, a memory storage apparatus and a memory control circuit unit.

Description of Related Art

Portable electronic devices such as mobile phones and notebook computers have developed rapidly in recent years, resulting in a rapid increase in consumer demand for storage media. Since rewriteable non-volatile memory modules (such as flash memory) are characterized in non-volatile data, power saving, small size, and no mechanical structure, they are very suitable to be built into various portable electronic devices as exemplified above.

Generally speaking, the memory controller triggers data maintenance operations such as data scanning and/or data refresh on the rewritable non-volatile memory module periodically or based on specific conditions (for example, the data read from a certain physical page contains too many error bits), so as to proactively maintain the accuracy of data stored in rewritable non-volatile memory modules. However, after the memory storage apparatus has been used for a period of time, the preset triggering conditions for data maintenance operations cannot be used to optimize one or more physical units (e.g., physical pages). For example, no instruction is available to immediately perform data refresh on the physical units that urgently need data refresh, whereas data refresh is performed frequently on physical units that do not urgently need data refresh. Accordingly, there is a lack of efficiency in data maintenance performed on the rewritable non-volatile memory module.

SUMMARY

The present disclosure provides a memory management method, a memory storage apparatus and a memory control circuit unit, which may improve the efficiency of data maintenance for rewritable non-volatile memory modules.

An exemplary embodiment of the present disclosure provides a memory management method, which is adaptable for a rewritable non-volatile memory module, wherein the rewritable non-volatile memory module includes a plurality of physical units, and the memory management method includes: sending a plurality of read command sequences including a first read command sequence and a second read command sequence, wherein the first read command sequence is configured to instruct a performing of a first read operation on a first physical unit of the plurality of physical units, and the second read command sequence is configured to instruct a performing of a second read operation on the first physical unit; determining a system parameter according to a time interval between a first read time point corresponding to the first read operation and a second read time point corresponding to the second read operation; and instructing the rewritable non-volatile memory module to perform a specific operation according to the system parameter.

An exemplary embodiment of the present disclosure further provides a memory storage apparatus, which includes a connection interface unit, a rewritable non-volatile memory module and a memory control circuit unit. The connection interface unit is coupled to a host system. The rewritable non-volatile memory module includes a plurality of physical units. The memory control circuit unit is coupled to the connection interface unit and the rewritable non-volatile memory module. The memory control circuit unit is configured to: send a plurality of read command sequences including a first read command sequence and a second read command sequence, wherein the first read command sequence is configured to instruct a performing of a first read operation on a first physical unit of the plurality of physical units, and the second read command sequence is configured to instruct a performing of a second read operation on the first physical unit; determine a system parameter according to a time interval between a first read time point corresponding to the first read operation and a second read time point corresponding to the second read operation; and instruct the rewritable non-volatile memory module to perform a specific operation according to the system parameter.

An exemplary embodiment of the present disclosure further provides a memory control circuit unit for controlling a rewritable non-volatile memory module. The rewritable non-volatile memory module includes a plurality of physical units. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface. The memory management circuit is configured to: send a plurality of read command sequences including a first read command sequence and a second read command sequence, wherein the first read command sequence is configured to instruct a performing of a first read operation on a first physical unit of the plurality of physical units, and the second read command sequence is configured to instruct a performing of a second read operation on the first physical unit; determine a system parameter according to a time interval between a first read time point corresponding to the first read operation and a second read time point corresponding to the second read operation; and instruct the rewritable non-volatile memory module to perform a specific operation according to the system parameter.

Based on the above, after sending multiple read command sequences to instruct to read data from the first physical unit, at least one system parameter may be determined according to a time interval between a first read time point corresponding to a first read command sequence in the plurality of read command sequences and a second read time point corresponding to a second read command sequence in the plurality of read command sequences, and at least one specific operation for the rewritable non-volatile memory module may be performed based on this system parameter. In this way, it is possible to effectively improve the efficiency of data maintenance for rewritable non-volatile memory modules.

BRIEF DESCRIPTION OF THE DRAWINGS

FIG. 7 is a schematic diagram of a data table according to an exemplary embodiment of the present disclosure.

FIG. 8 is a schematic diagram of a data table according to an exemplary embodiment of the present disclosure.

DESCRIPTION OF THE EMBODIMENTS

Generally speaking, a memory storage apparatus (also known as a memory storage system) includes a rewritable non-volatile memory module and a controller (also known as a control circuit). The memory storage apparatus may be used with a host system such that the host system may write data to the memory storage apparatus or read data from the memory storage apparatus.

Figure 1:
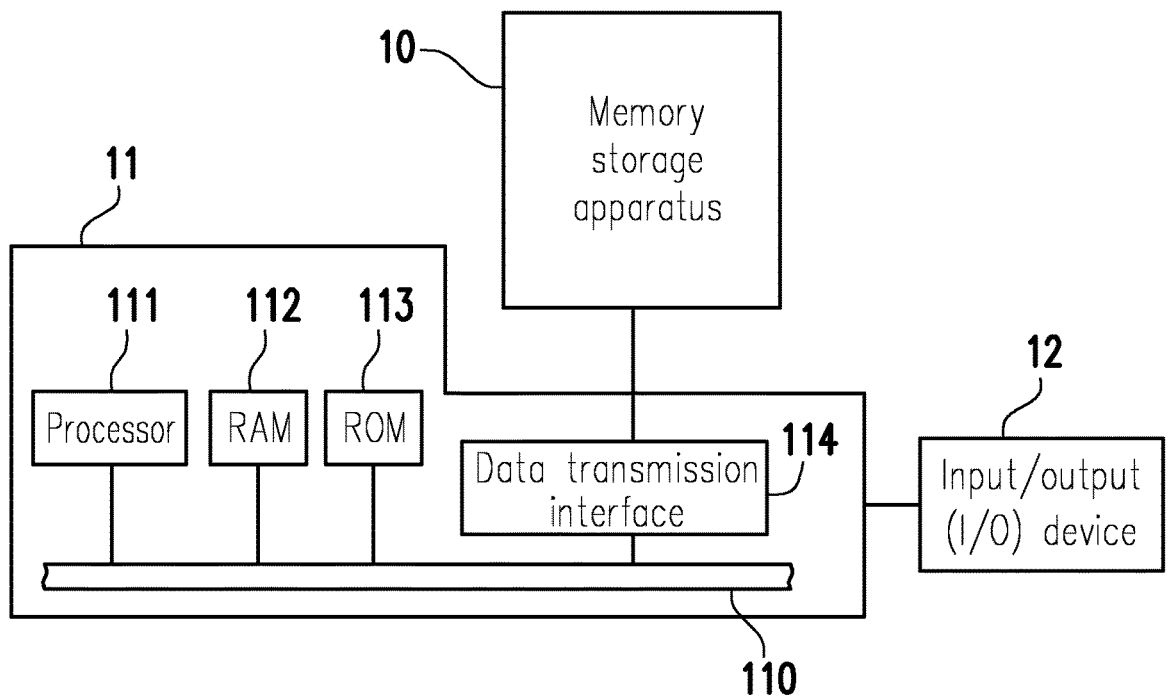
FIG. 1 is a schematic diagram of a host system, a memory storage apparatus, and an input/output (I/O) device according to an exemplary embodiment of the present disclosure.
Figure 2:
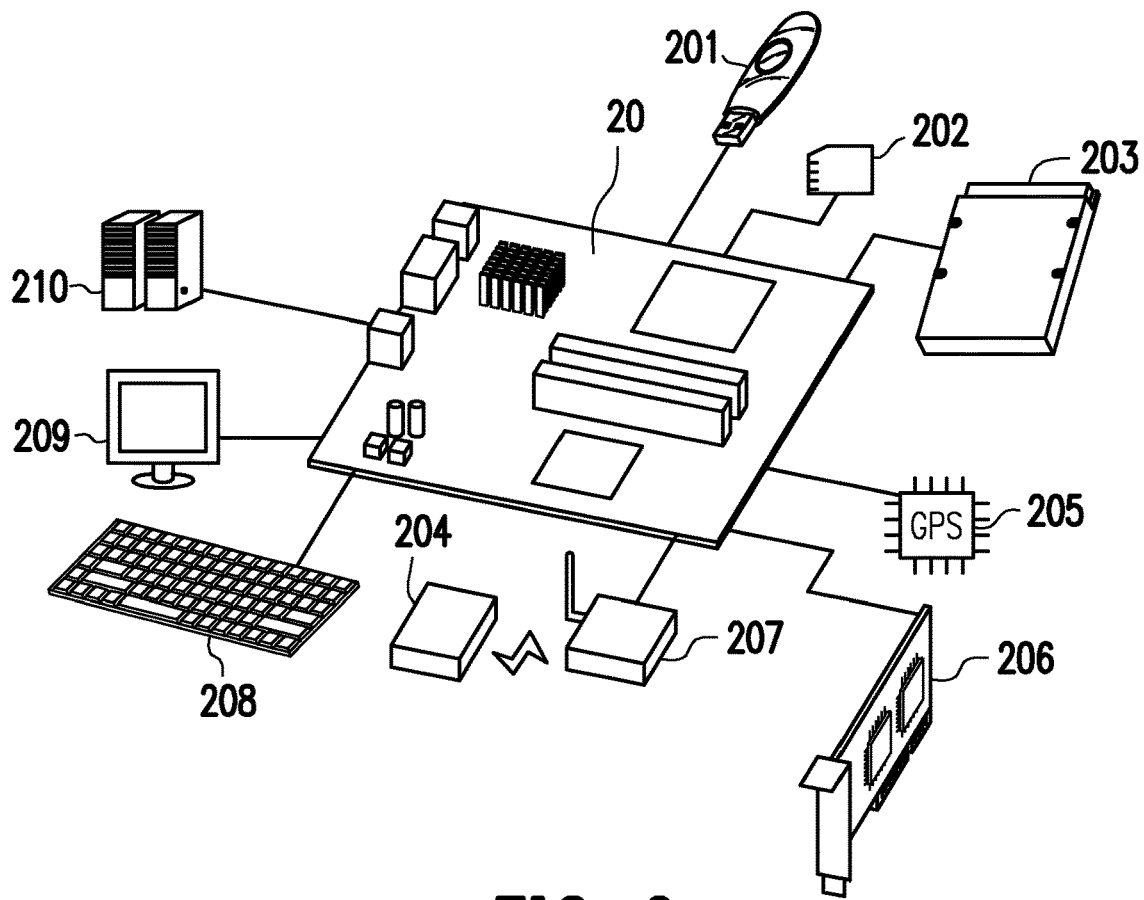
FIG. 2 is a schematic diagram of a host system, a memory storage apparatus, and an I/O device according to an exemplary embodiment of the present disclosure.

FIG. 1 is a schematic diagram of a host system, a memory storage apparatus, and an input/output (I/O) device according to an exemplary embodiment of the present disclosure. FIG. 2 is a schematic diagram of a host system, a memory storage apparatus, and an I/O device according to an exemplary embodiment of the present disclosure.

Referring to FIG. 1 and FIG. 2, the host system 11 may include a processor 111, a random access memory (RAM) 112, a read-only memory (ROM) 113 and a data transmission interface 114. The processor 111, the random access memory 112, the read-only memory 113 and the data transmission interface 114 may be coupled to a system bus 110.

In an exemplary embodiment, the host system 11 may be coupled to the memory storage apparatus 10 through the data transmission interface 114. For example, the host system 11 may store data to or read data from the memory storage apparatus 10 through the data transmission interface 114. In addition, the host system 11 may be coupled to the I/O device 12 through the system bus 110. For example, the host system 11 may transmit output signals to the I/O device 12 or receive input signals from the I/O device 12 through the system bus 110.

In an exemplary embodiment, the processor 111, the random access memory 112, the read-only memory 113 and the data transmission interface 114 may be disposed on the motherboard 20 of the host system 11. The number of data transmission interfaces 114 may be one or more. Through the data transmission interface 114, the motherboard 20 may be coupled to the memory storage apparatus 10 through in a wired or wireless manner.

In an exemplary embodiment, the memory storage apparatus 10 may be, for example, a flash drive 201, a memory card 202, a solid state drive (SSD) 203 or a wireless memory storage apparatus 204. The wireless memory storage apparatus 204 may be, for example, a Near Field Communication (NFC) memory storage apparatus, a wireless fidelity (WiFi) memory storage apparatus, a Bluetooth memory storage apparatus or a Bluetooth low energy memory storage apparatus (such as iBeacon) and other memory storage apparatuses based on various wireless communication technologies. In addition, the motherboard 20 may also be coupled to a Global Positioning System (GPS) module 205, a network interface card 206, a wireless transmission device 207, a keyboard 208, a screen 209, a speaker 210, and various I/O devices through the system bus 110. For example, in an exemplary embodiment, the motherboard 20 may access the wireless memory storage apparatus 204 through the wireless transmission device 207.

In an exemplary embodiment, the host system 11 is a computer system. In an exemplary embodiment, the host system 11 may be any system that can substantially cooperate with a memory storage apparatus to store data. In an exemplary embodiment, the memory storage apparatus 10 and the host system 11 may include the memory storage apparatus 30 and the host system 31 of FIG. 3 respectively.

Figure 3:
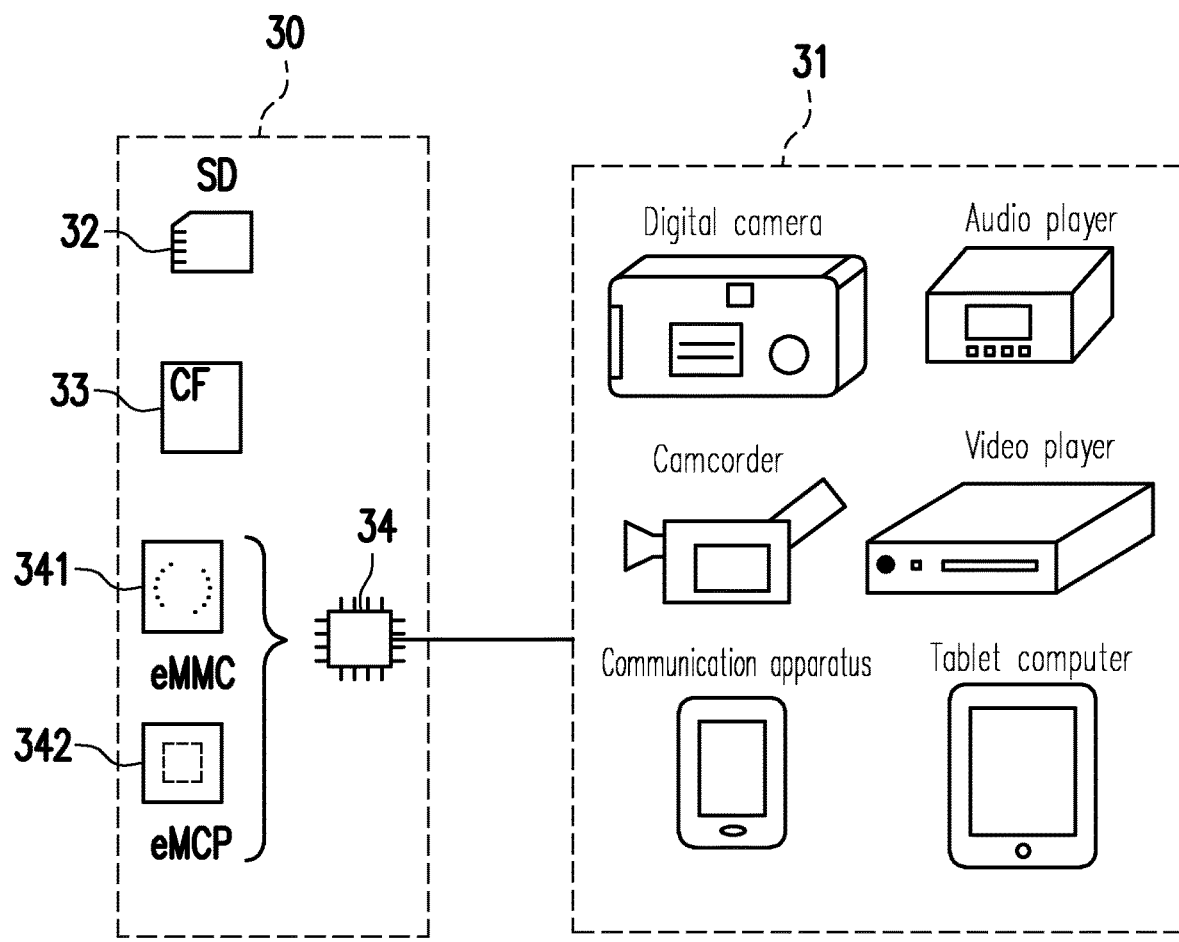
FIG. 3 is a schematic diagram of a host system and a memory storage apparatus according to an exemplary embodiment of the present disclosure.

FIG. 3 is a schematic diagram of a host system and a memory storage apparatus according to an exemplary embodiment of the present disclosure. Referring to FIG. 3, the memory storage apparatus 30 may be used in conjunction with the host system 31 to store data. For example, the host system 31 may be a digital camera, a video camera, a communication device, an audio player, a video player or a tablet computer system. For example, the memory storage apparatus 30 may be a Secure Digital (SD) card 32, a Compact Flash (CF) card 33 or an embedded storage device 34 and various non-volatile memory storage apparatuses used by the host system 31. The embedded storage device 34 includes an embedded Multi Media Card (eMMC) 341 and/or an embedded Multi Chip Package (eMCP) storage device 342 and various embedded storage devices that directly couple the memory module on the substrate of the host system.

Figure 4:
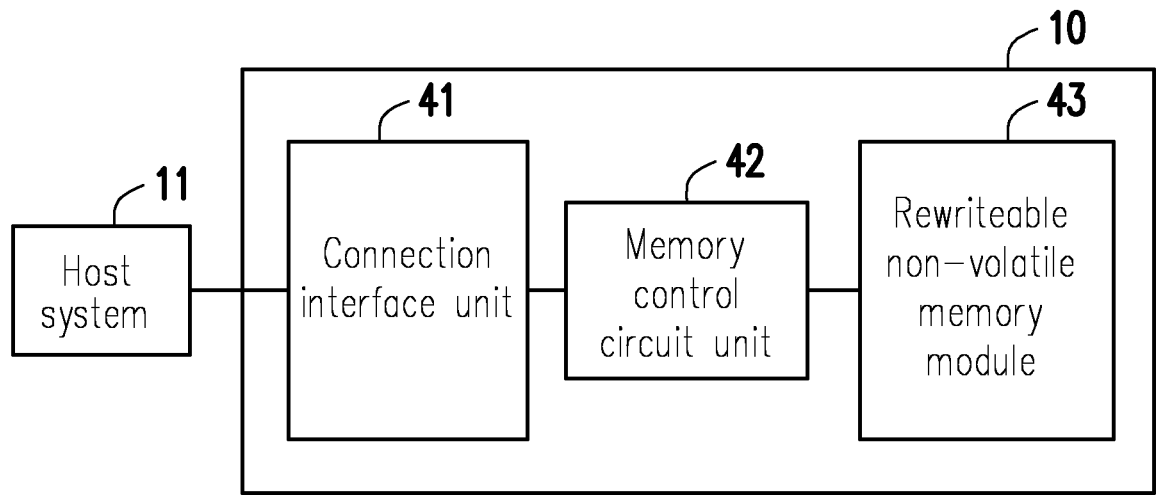
FIG. 4 is a schematic diagram of a memory storage apparatus according to an exemplary embodiment of the present disclosure.

FIG. 4 is a schematic diagram of a memory storage apparatus according to an exemplary embodiment of the present disclosure. Referring to FIG. 4, the memory storage apparatus 10 includes a connection interface unit 41, a memory control circuit unit 42 and a rewritable non-volatile memory module 43.

The connection interface unit 41 is coupled to the host system 11. The memory storage apparatus 10 may communicate with the host system 11 through the connection interface unit 41. In an exemplary embodiment, the connection interface unit 41 is compatible with the Peripheral Component Interconnect Express (PCI Express) standard. In an exemplary embodiment, the connection interface unit 41 may also be compliant with the Serial Advanced Technology Attachment (SATA) standard, Parallel Advanced Technology Attachment (PATA) standard, Institute of Electrical and Electronics Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP Interface standard, CF interface standard, Integrated Device Electronics (IDE) standard or other suitable standards. The connection interface unit 41 and the memory control circuit unit 42 may be packaged in a chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute a plurality of logic gates or control commands implemented in hardware mode or firmware mode and perform data writing, reading and erasing operations in the rewritable non-volatile memory module 43 according to the commands of the host system 11.

The rewritable non-volatile memory module 43 is configured to store data written by the host system 11. The rewritable non-volatile memory module 43 may include a Single Level Cell (SLC) NAND flash memory module (i.e., a flash memory module that is able to store 1 bit in one memory cell), a Multi Level Cell (MLC) NAND flash memory module (i.e., a flash memory module that is able to store 2 bits in one memory cell), a Triple Level Cell (TLC) NAND flash memory module (i.e., a flash memory module that is able to store 3 bits in one memory cell), a Quad Level Cell (QLC) NAND flash memory module (i.e., a flash memory module that is able to store 4 bits in one memory cell), other flash memory modules, or other memory modules with the same characteristics.

Each memory cell in the rewritable non-volatile memory module 43 stores one or more bits based on changes in voltage (hereinafter also referred to as critical voltage). Specifically, there is a charge trapping layer between the control gate and the channel of each memory cell. By applying a write voltage to the control gate, the amount of electrons in the charge trapping layer may be changed, thereby changing the critical voltage of the memory cell. This operation of changing the critical voltage of the memory cell is also called "writing data into the memory cell" or "programming the memory cell." As the critical voltage changes, each memory cell in the rewritable non-volatile memory module 43 has multiple storage states. By applying a read voltage, it is possible to determine which storage state a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, memory cells on the same word line may form one or more physical programming units. If each memory cell may store more than 2 bits, the physical programming units on the same word line may at least be classified into lower physical programming units and upper physical programming units. For example, the Least Significant Bit (LSB) of a memory cell belongs to the lower physical programming unit, and the Most Significant Bit (MSB) of a memory cell belongs to the upper physical programming unit. Generally speaking, in MLC NAND flash memory, the writing speed of the lower physical programming unit will be greater than the writing speed of the upper physical programming unit, and/or the reliability of the lower physical programming unit is higher than the reliability of the upper physical programming unit.

In an exemplary embodiment, the physical programming unit is the minimum unit of programming. That is, the physical programming unit is the minimum unit for writing data. For example, the physical programming unit may be a physical page or a physical sector. If the physical programming units are physical pages, these physical programming units may include data bit areas and redundancy bit areas. The data bit area contains multiple physical sectors to store user data, while the redundancy bit area is configured to store system data (for example, management data such as error correction codes). In an exemplary embodiment, the data bit area includes 32 physical sectors, and the size of one physical sector is 512 bytes (B). However, in other exemplary embodiments, the data bit area may also include 8, 16, or more or less physical sectors, and the size of each physical sector may also be larger or smaller. On the other hand, the physical erasing unit is the minimum unit of erase operation. That is, each physical erasing unit contains a minimum number of memory cells that are erased together. For example, the physical erasing unit is a physical block.

Figure 5:
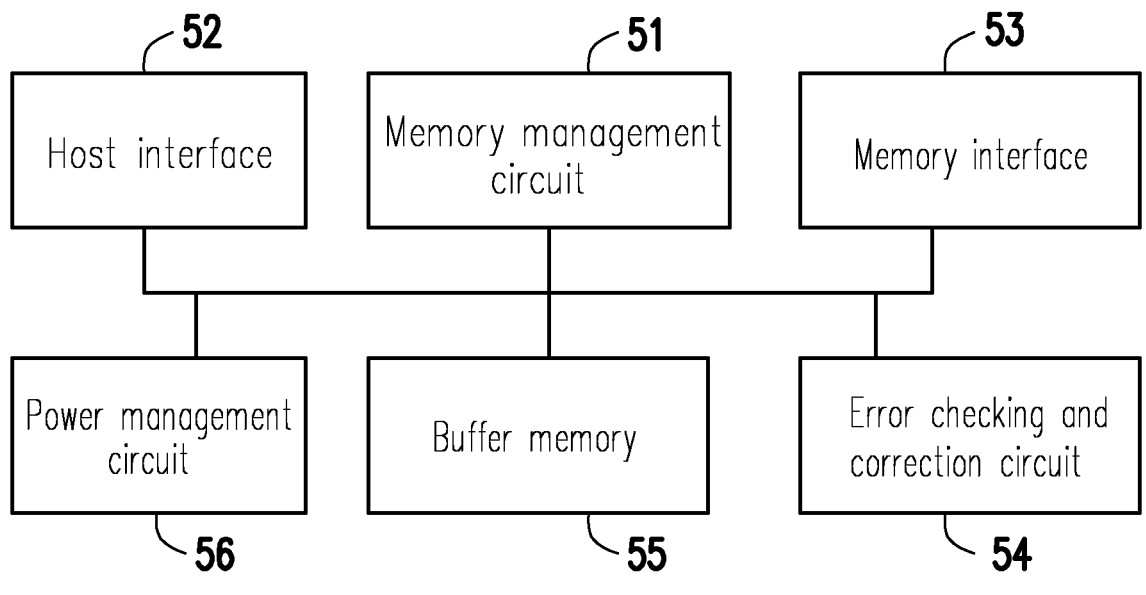
FIG. 5 is a schematic diagram of a memory control circuit unit according to an exemplary embodiment of the present disclosure.

FIG. 5 is a schematic diagram of a memory control circuit unit according to an exemplary embodiment of the present disclosure. Referring to FIG. 5, the memory control circuit unit 42 includes a memory management circuit 51, a host interface 52 and a memory interface 53.

The memory management circuit 51 is configured to control the overall operation of the memory control circuit unit 42. Specifically, the memory management circuit 51 has a plurality of control commands, and when the memory storage apparatus 10 is operating, these control commands will be executed to perform operations such as writing, reading, and erasing data. In the description of the operation of the memory management circuit 51 below, the description is equivalent to describing the operation of the memory control circuit unit 42 and the memory storage apparatus 10.

In an exemplary embodiment, the control commands of the memory management circuit 51 are implemented in the form of firmware. For example, the memory management circuit 51 has a microprocessor unit (not shown) and a read-only memory (not shown), and these control commands are burned into the read-only memory. When the memory storage apparatus 10 is operating, these control commands will be executed by the microprocessor unit to perform data writing, reading, erasing and other operations.

In an exemplary embodiment, the control commands of the memory management circuit 51 may also be stored in a specific area (for example, the system area in the memory module dedicated to storing system data) of the rewritable non-volatile memory module 43 in the form of program code. In addition, the memory management circuit 51 has a microprocessor unit (not shown), a read-only memory (not shown) and a random access memory (not shown). In particular, the read-only memory has a boot code, and when the memory control circuit unit 42 is enabled, the microprocessor unit will first execute the boot code to load the control commands stored in the rewritable non-volatile memory module 43 into the random access memory of the memory management circuit 51. Afterwards, the microprocessor unit will run these control commands to perform operations such as writing, reading and erasing data.

In an exemplary embodiment, the control commands of the memory management circuit 51 may also be implemented in the form of hardware. For example, the memory management circuit 51 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage the memory cells or memory cell groups of the rewritable non-volatile memory module 43. The memory writing circuit is configured to issue a write command sequence to the rewritable non-volatile memory module 43 to write data into the rewritable non-volatile memory module 43. The memory reading circuit is configured to issue a read command sequence to the rewritable non-volatile memory module 43 to read data from the rewritable non-volatile memory module 43. The memory erasing circuit is configured to issue an erasing command sequence to the rewritable non-volatile memory module 43 to erase data from the rewritable non-volatile memory module 43. The data processing circuit is configured to process data to be written to the rewritable non-volatile memory module 43 and data to be read from the rewritable non-volatile memory module 43. The write command sequence, the read command sequence and the erase command sequence may each include one or more program codes or scripts and are used to instruct the rewritable non-volatile memory module 43 to perform corresponding write, read and erase operations. In an exemplary embodiment, the memory management circuit 51 may also issue other types of command sequences to the rewritable non-volatile memory module 43 to instruct the execution of corresponding operations.

The host interface 52 is coupled to the memory management circuit 51. The memory management circuit 51 may communicate with the host system 11 through the host interface 52. The host interface 52 may be configured to receive and identify commands and data transmitted by the host system 11. For example, commands and data sent by the host system 11 may be sent to the memory management circuit 51 through the host interface 52. In addition, the memory management circuit 51 may transmit data to the host system 11 through the host interface 52. In the exemplary embodiment, the host interface 52 is compatible with the PCI Express standard. However, it should be understood that the present disclosure is not limited thereto. The host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard or other suitable data transmission standards.

The memory interface 53 is coupled to the memory management circuit 51 and configured to access the rewritable non-volatile memory module 43. For example, the memory management circuit 51 may access the rewritable non-volatile memory module 43 through the memory interface 53. That is to say, the data to be written to the rewritable non-volatile memory module 43 will be converted into a format acceptable to the rewritable non-volatile memory module 43 through the memory interface 53. Specifically, if the memory management circuit 51 is to access the rewritable non-volatile memory module 43, the memory interface 53 will send a corresponding command sequence. For example, these command sequences may include a write command sequence instructing to write data, a read command sequence instructing to read data, an erase command sequence instructing to erase data, and other corresponding command sequences instructing to perform various memory operations (e.g., change read voltage levels or perform garbage collection (GC) operations, etc.). These command sequences are generated, for example, by the memory management circuit 51 and transmitted to the rewritable non-volatile memory module 43 through the memory interface 53. These command sequences may include one or more signals or data on the bus. These signals or data may include scripts or program codes. For example, the read command sequence will include the read identification code, memory address and other information.

In an exemplary embodiment, the memory control circuit unit 42 further includes an error checking and correction circuit 54, a buffer memory 55 and a power management circuit 56.

The error checking and correction circuit 54 is coupled to the memory management circuit 51 and is configured to perform error checking and correction operations to ensure the accuracy of the data. Specifically, when the memory management circuit 51 receives a write command from the host system 11, the error checking and correction circuit 54 generates a corresponding error correcting code (ECC) and/or error detecting code (EDC) in response to the write command, and the memory management circuit 51 will write the data corresponding to the write command and the corresponding error correcting code and/or error detecting code into the rewritable non-volatile memory module 43. Afterwards, when the memory management circuit 51 reads data from the rewritable non-volatile memory module 43, the memory management circuit 51 will also read the ECC and/or EDC corresponding to the data, and the error checking and correction circuit 54 will perform error checking and correction operations on the read data based on this ECC and/or EDC. For example, the error checking and correction circuit 54 may use a Low Density Parity Check code (LDPC code), a BCH code, a Reed-Solomon code (RS code), an Exclusive OR (XOR) code and other encoding/decoding algorithms to encode and decode data.

The buffer memory 55 is coupled to the memory management circuit 51 and configured to temporarily store data. The power management circuit 56 is coupled to the memory management circuit 51 and configured to control the power supply of the memory storage apparatus 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
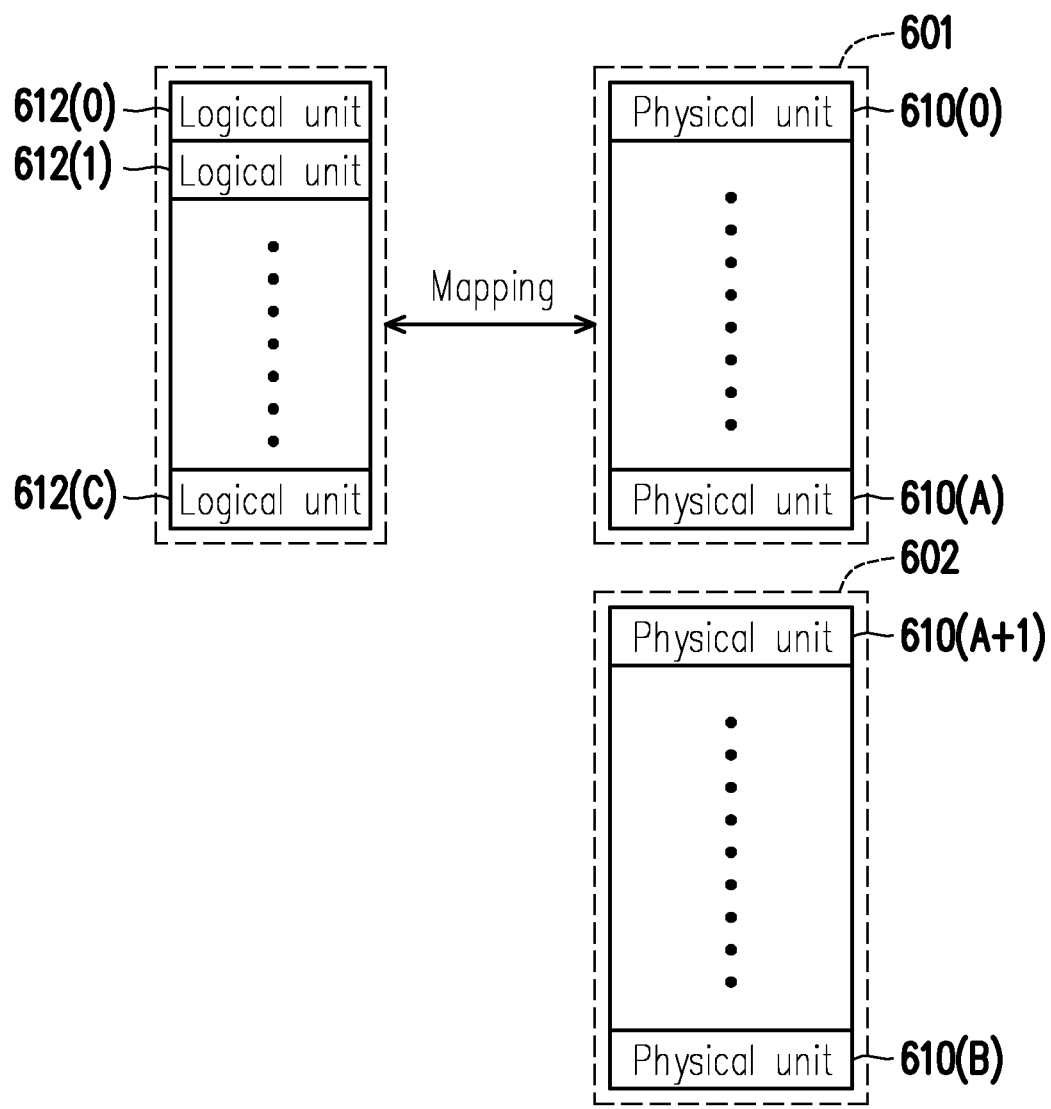
FIG. 6 is a schematic diagram of managing a rewritable non-volatile memory module according to an exemplary embodiment of the present disclosure.

FIG. 6 is a schematic diagram of managing a rewritable non-volatile memory module according to an exemplary embodiment of the present disclosure. Referring to FIG. 6, the memory management circuit 51 may logically group the physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also be composed of multiple consecutive or non-consecutive physical addresses. In an exemplary embodiment, a physical unit may also refer to a virtual block (VB). A virtual block may include multiple physical addresses or multiple physical programming units. In an exemplary embodiment, a virtual block may include one or more physical erasing units.

In an exemplary embodiment, the physical units 610(0) to 610(A) in the storage area 601 are used to store user data (e.g., user data from the host system 11 of FIG. 1). For example, the physical units 610(0) to 610(A) in the storage area 601 may store valid data and invalid data. The physical units 610(A+1) to 610(B) in the spare area 602 do not store data (e.g., valid data). For example, if a certain physical unit does not store valid data, this physical unit may be associated (or added) to the spare area 602. In addition, the physical units in the spare area 602 (or the physical units that do not store valid data) may be erased. As new data is written, one or more physical units may be retrieved from the spare area 602 to store the new data. In an exemplary embodiment, the spare area 602 is also called a free pool.

In an exemplary embodiment, the memory management circuit 51 may configure the logical units 612(0) to 612(C) to map the physical units 610(0) to 610(A) in the storage area 601. In an exemplary embodiment, each logical unit corresponds to a logical address. For example, a logical address may include one or more logical block addresses (LBA) or other logical management units. In an exemplary embodiment, a logical unit may also correspond to a logical programming unit or be composed of multiple consecutive or non-consecutive logical addresses.

It should be noted that one logical unit may be mapped to one or more physical units. If a certain physical unit is currently mapped by a certain logical unit, it means that the data currently stored in this physical unit includes valid data. On the contrary, if a certain physical unit is not currently mapped by any logical unit, it means that the data currently stored in this physical unit is invalid data.

In an exemplary embodiment, the memory management circuit 51 may record management data (also referred to as logical-to-physical mapping information) describing the mapping relationship between logical units and physical units in at least one logical-to-physical mapping table (L2P table). When the host system 11 is to read data from or write data to the memory storage apparatus 10, the memory management circuit 51 may access the rewritable non-volatile memory module 43 according to the information in the L2P table.

In an exemplary embodiment, the memory management circuit 51 may send a plurality of read command sequences to the rewritable non-volatile memory module 43. For example, these read command sequences include a first read command sequence and a second read command sequence. For example, the time point of sending the second read command sequence may be later than the time point of sending the first read command sequence.

In an exemplary embodiment, the first read command sequence is configured to instruct at least one physical unit (also referred to as the first physical unit) in the rewritable non-volatile memory module 43 to perform a read operation (also called the first read operation). For example, the first physical unit may include at least one physical unit belonging to the storage area 601 in FIG. 6. In response to the first read command sequence, in the first read operation, the rewritable non-volatile memory module 43 may read data from the first physical unit. In addition, the second read command sequence is also configured to instruct the first physical unit to perform a read operation (also referred to as a second read operation). It should be noted that the first read command sequence and the second read command sequence instruct to perform data reading on the same physical unit (i.e., the first physical unit) in the rewritable non-volatile memory module 43. In response to the second read command sequence, in the second read operation, the rewritable non-volatile memory module 43 may read data from the first physical unit.

In an exemplary embodiment, the memory management circuit 51 may record the read time point corresponding to the first read operation (also referred to as the first read time point) and the read time point (also called the second read time point) corresponding to the second read operation. For example, the first read time point may reflect a time point at which execution of the first read operation begins, is being performed, or ends. In addition, the second read time point may reflect a time point when execution of the second read operation begins, is being executed, or ends.

In an exemplary embodiment, between the first read time point and the second read time point (or between the first read operation and the second read operation), the rewritable non-volatile memory module 43 does not perform other read operations on the first physical unit. In an exemplary embodiment, between the first read time point and the second read time point (or between the first read operation and the second read operation), the rewritable non-volatile memory module 43 may perform other types of access operations other than read operations on the first physical unit, such as write operations and/or erase operations.

In an exemplary embodiment, the memory management circuit 51 may determine at least one parameter (also referred to as a system parameter) based on the first read time point and the second read time point. For example, the memory management circuit 51 may determine (including update and/or adjust) the parameter value of the system parameter based on the first read time point and the second read time point. Then, the memory management circuit 51 may instruct the rewritable non-volatile memory module 43 to perform specific operations according to the system parameters.

In an exemplary embodiment, the memory management circuit 51 may obtain a time interval between the first read time point and the second read time point according to the first read time point and the second read time point. For example, this time interval may reflect the time that has passed after one read operation is performed on the first physical unit (i.e., the first read operation) before the next read operation (i.e., the second read operation) is performed on the first physical unit. For example, assuming that the first read time point is 8:10'5"00 in the morning on a certain day, and the second read time point is 8:10'7"00 in the morning on the same day, it means that the time interval between the first read time point and the second read time point is 2 seconds. The memory management circuit 51 may determine the system parameters according to this time interval.

In an exemplary embodiment, the memory management circuit 51 may update the statistical information according to the time interval. This statistical information may reflect the average of multiple time intervals (also called historical time intervals) obtained in the past. Further, this statistical information may reflect an average of the time intervals between any two read operations performed successively on the first physical unit. Then, the memory management circuit 51 may update the system parameters based on the statistical information.

In an exemplary embodiment, the memory management circuit 51 may adjust the parameter value of the system parameter according to the change (or change trend) of the statistical information. In an exemplary embodiment, the change (or change trend) of the statistical information may be positively correlated to the parameter value of the system parameter. For example, in response to the increase in the statistical information (representing an increase in the average value of the plurality of historical time intervals), the memory management circuit 51 may increase the parameter value of the system parameter. Conversely, in response to the decrease in the statistical information (representing a decrease in the average value of the plurality of historical time intervals), the memory management circuit 51 may decrease the parameter value of the system parameter.

In an exemplary embodiment, the change (or change trend) of the statistical information may be negatively correlated to the parameter value of the system parameter. For example, in response to the increase in the statistical information, the memory management circuit 51 may decrease the parameter value of the system parameter. Conversely, in response to the decrease in the statistical information, the memory management circuit 51 may increase the parameter value of the system parameter.

In an exemplary embodiment, the system parameters include specific parameters (also referred to as first system parameter). The first system parameter may be used to trigger a data scanning operation on the rewritable non-volatile memory module 43 to detect errors in the first physical unit. For example, during a data scanning operation for the first physical unit, the memory management circuit 51 may send at least one read command sequence to the rewritable non-volatile memory module 43. The rewritable non-volatile memory module 43 may read data from the first physical unit according to the at least one read command sequence and decode the read data through the decoding circuit (such as the error checking and correction circuit 54) to detect errors in the first physical unit. In addition, the memory management circuit 51 may decide whether to further perform a data refresh operation or other data maintenance operations on the first physical unit according to the execution result of the data scanning operation, which is not limited by the present disclosure.

In an exemplary embodiment, the system parameters include another parameter (also called a second system parameter). The second system parameter may be used to trigger a data refresh operation on the rewritable non-volatile memory module 43 to move the data from the first physical unit. For example, in a data refresh operation for the first physical unit, the memory management circuit 51 may send at least one read command sequence to the rewritable non-volatile memory module 43. The rewritable non-volatile memory module 43 may read data from the first physical unit according to the at least one read command sequence and decode the read data through the decoding circuit (such as the error checking and correction circuit 54) to correct errors in the first physical unit. Then, the memory management circuit 51 may send at least one write command sequence to the rewritable non-volatile memory module 43. The rewritable non-volatile memory module 43 may re-store the corrected data into another physical unit (also called a second physical unit) according to the at least one write command sequence. For example, the second physical unit may include at least one physical unit belonging to the spare area 602 in FIG. 6. Through this data refresh operation, the data originally stored in the first physical unit (for example, data with more error bits) may be replaced by corrected data (i.e., data that does not contain error bits) subsequently stored in the second physical unit.

In an exemplary embodiment, the parameter value of the second system parameter may be greater than the parameter value of the first system parameter. In an exemplary embodiment, the parameter value of the second system parameter may be twice the parameter value of the first system parameter. For example, assuming that the parameter value of the first system parameter is S1 and the parameter value of the second system parameter is S2, then S2=2×S1. However, in another exemplary embodiment, the parameter value of the first system parameter and the parameter value of the second system parameter may be adjusted according to practical needs, and are not limited by the present disclosure.

In an exemplary embodiment, the memory management circuit 51 may obtain at least one deterioration evaluation parameter related to the rewritable non-volatile memory module 43. For example, the deterioration evaluation parameter includes at least one of a read count, a write count, and an erase count. The read count may reflect the number of times the first physical unit has been read (over a period of time). The write count may reflect the number of times the first physical unit has been programmed (over a period of time). The erase count may reflect the number of times the first physical unit has been erased (over a period of time). In an exemplary embodiment, the deterioration evaluation parameters may further include other types of parameters that may be used to evaluate or reflect the deterioration status of the rewritable non-volatile memory module 43, which is not limited by the present disclosure.

In an exemplary embodiment, read count is used as an example of a deterioration evaluation parameter. Assume that the read count corresponding to the first physical unit is "1000", it means that the first physical unit has been read 1000 times (over a period of time). The memory management circuitry 51 may compare this deterioration evaluation parameter (i.e., read count) with the system parameter. Then, the memory management circuit 51 may instruct the rewritable non-volatile memory module 43 to perform the specific operation according to the comparison result.

In an exemplary embodiment, the memory management circuit 51 may decide to perform a data scanning operation on the first physical unit, perform a data refresh operation on the first physical unit, or not to perform the data scanning operation and the data refresh operation on the first physical unit based on the comparison results of the deterioration evaluation parameters with the first system parameter and the second system parameter respectively. For example, assume that the first system parameter, the second system parameter and the read count corresponding to the first physical unit are represented by S1, S2 and C respectively, wherein S2 is greater than S1. According to the comparison results of C with S1 and S2 respectively, if C is greater than S2 (i.e., C>S1), the memory management circuit 51 may instruct the rewritable non-volatile memory module 43 to perform a data refresh operation on the first physical unit, so as to move the data from the first physical unit. If C is between S1 and S2 (i.e., S2>C>S1), the memory management circuit 51 may instruct the rewritable non-volatile memory module 43 to perform a data scanning operation on the first physical unit to detect the error in the first physical unit. However, if C is not greater than S1 (i.e., S1≥C), the memory management circuit 51 may not perform the specific operations (such as data refreshing operations and data scanning operations). It should be noted that, for different types of system parameters and/or deterioration evaluation parameters, the memory management circuit 51 may adopt different operating strategies to manage whether to perform the specific operations, which is not limited by the present disclosure.

FIG. 7 is a schematic diagram of a data table according to an exemplary embodiment of the present disclosure. Referring to FIG. 7, in an exemplary embodiment, the data table 701 may be used to record the time point at which the plurality of physical units in the rewritable non-volatile memory module 43 were last read (i.e., the second read time point) and the average read time interval (i.e., the statistical information) corresponding to each physical unit. For example, according to the data table 701, the read count, last read time and average read time interval corresponding to the physical unit numbered 1 are C(1), T(1) and TAVG(1) respectively; the read count, last read time and average read time interval corresponding to the physical unit numbered 2 are C(2), T(2) and TAVG(2) respectively. By analogy, the read count, last read time and average read time interval corresponding to the physical unit numbered n are C(n), T(n) and TAVG(n) respectively.

In an exemplary embodiment, each time a read operation is performed on a certain physical unit, the read count, last read time and average read time interval corresponding to the physical unit may be updated. For example, after performing a read operation on the physical unit numbered 1, in the data table 701, C(1), T(1), and TAVG(1) may be updated.

FIG. 8 is a schematic diagram of a data table according to an exemplary embodiment of the present disclosure. Please refer to FIG. 8. In an exemplary embodiment, the data table 801 may be used to record system parameters corresponding to different average read time intervals TAVG (i.e., the statistical information), including S1 (i.e., the first system parameter) and S2 (i.e., the second system parameter). For example, according to the data table 801, when the average read time interval TAVG is 1 (for example, 1 second), the corresponding system parameters S1 and S2 are S1(2) and S2(2) respectively; when the average read time interval TAVG is 2 (for example, 2 seconds), the corresponding system parameters S1 and S2 are S1(2) and S2(2) respectively. By analogy, when the average read time interval TAVG is m (for example, m seconds), the corresponding system parameters S1 and S2 are S1(m) and S2(m) respectively.

In an exemplary embodiment, the memory management circuit 51 may query the data table 801 according to the average read time interval TAVG corresponding to each physical unit to obtain the corresponding system parameters S1 and/or S2. Then, the memory management circuit 51 may instruct the rewritable non-volatile memory module 43 to perform specific operations (such as data refreshing operations and/or data scanning operations) according to the system parameters S1 and/or S2. In an exemplary embodiment, compared with using fixed system parameters, by using dynamically set system parameters (such as first system parameters and/or second system parameters), it is possible to effectively improve the efficiency of data maintenance on the rewritable non-volatile memory module 43.

In an exemplary embodiment, the data tables 701 and 801 may be stored in the rewritable non-volatile memory module 43. For example, data tables 701 and 801 may be stored in the system area of the rewritable non-volatile memory module 43 together with other types of management tables (e.g., logical-to-physical mapping tables and/or bad block management tables). The data (and physical units) in this system area may be set to be inaccessible to the user (or the host system 11) to prevent modification by the user (or the host system 11). For example, the logical units 612(0) to 612(C) in FIG. 6 may be set to be unable to be mapped to the system area.

In an exemplary embodiment, the system parameter may also include another system parameter (also referred to as a third system parameter). The third system parameter may be used to affect the decoding mode used by the decoding circuit (e.g., error checking and correction circuit 54). For example, in response to the statistical information not being greater than a threshold value, the memory management circuit 51 may set the parameter value corresponding to the third system parameter of the first physical unit to "0". In response to the third system parameter being "0", when decoding the data read from the first physical unit, the decoding circuit (e.g., error checking and correction circuit 54) may decode the data based on a hard bit mode. Alternatively, in response to the statistical information being greater than the threshold value, the memory management circuit 51 may set the parameter value corresponding to the third system parameter of the first physical unit to "1". In response to the third system parameter being "1", when decoding the data read from the first physical unit, the decoding circuit may decode the data based on a soft bit mode.

In an exemplary embodiment, the decoding speed of the hard bit mode is faster than that of the soft bit mode. However, compared to the hard bit mode, the soft bit mode has more powerful error correction capabilities. Therefore, in an exemplary embodiment, by using the dynamically set system parameters (such as the third system parameters), the decoding efficiency of the decoding circuit (such as the error checking and correction circuit 54) may also be effectively improved.

Figure 9:
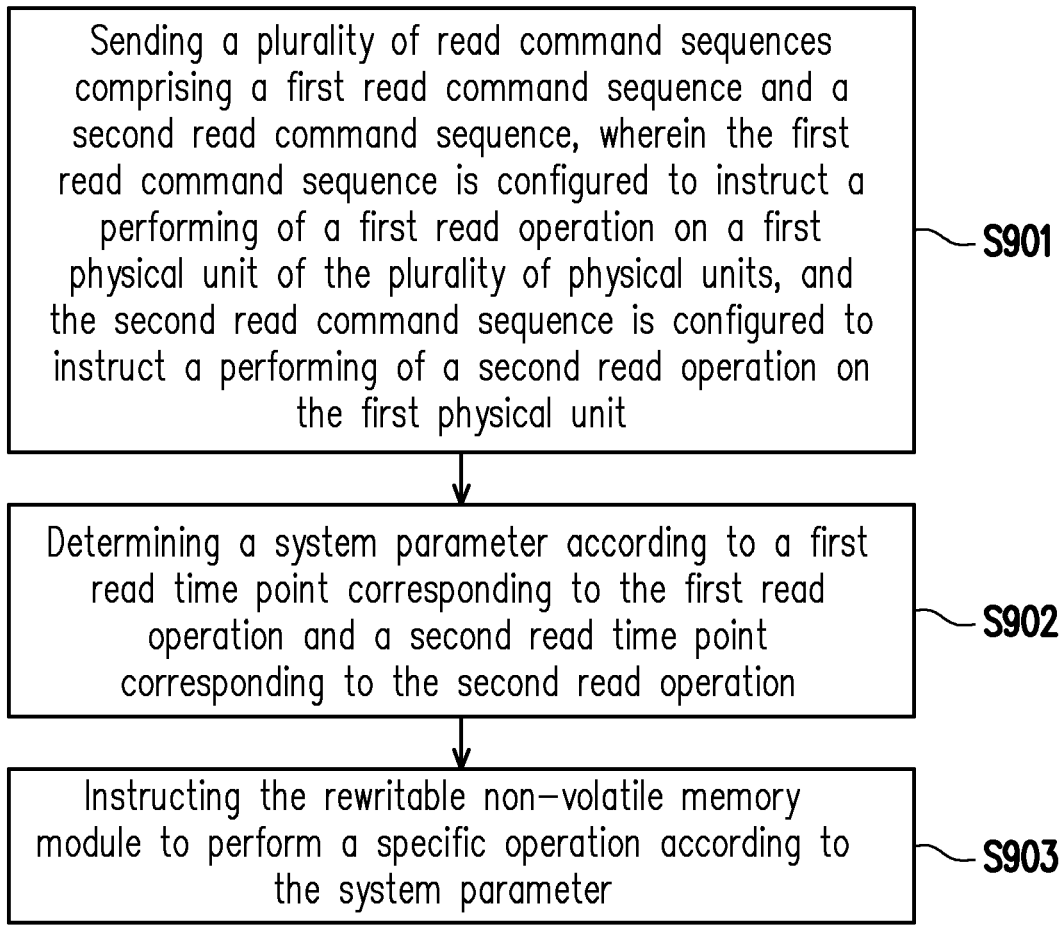
FIG. 9 is a flow chart of a memory management method according to an exemplary embodiment of the present disclosure.

FIG. 9 is a flow chart of a memory management method according to an exemplary embodiment of the present disclosure. Please refer to FIG. 9. In step S901, multiple read command sequences are sent, wherein the multiple read command sequences include a first read command sequence and a second read command sequence. The first read command sequence is configured to instruct performing a first read operation on the first physical unit, and the second read command sequence is configured to instruct performing a second read operation on the first physical unit. In step S902, system parameters are determined based on the first read time point corresponding to the first read operation and the second read time point corresponding to the second read operation. In step S903, the rewritable non-volatile memory module is instructed to perform a specific operation according to the system parameters.

However, each step in FIG. 9 has been described in detail above, and will not be repeated here. It is worth noting that each step in FIG. 9 may be implemented as multiple program codes or circuits, and the present disclosure is not limited thereto. In addition, the method in FIG. 9 may be used in conjunction with the above example embodiments or may be used alone, and is not limited by the present disclosure.

To sum up, the memory management method, memory storage apparatus and memory control circuit unit provided by the present disclosure may be used to dynamically determine (including update and/or adjust) system parameters based on the time interval between any two read operations performed successively on the same physical unit (such as the first physical unit). In this way, it is possible to improve the efficiency of performing data maintenance on the rewritable non-volatile memory module and/or the decoding efficiency of the decoding circuit.

Although the present disclosure has been disclosed above through embodiments, it is not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. A memory management method, which is adaptable for a rewritable non-volatile memory module, wherein the rewritable non-volatile memory module comprises a plurality of physical units, and the memory management method comprising:

sending a plurality of read command sequences comprising a first read command sequence and a second read command sequence, wherein the first read command sequence is configured to instruct a performing of a first read operation on a first physical unit of the plurality of physical units, and the second read command sequence is configured to instruct a performing of a second read operation on the first physical unit;
determining a system parameter according to a time interval between a first read time point corresponding to the first read operation and a second read time point corresponding to the second read operation; and
instructing the rewritable non-volatile memory module to perform a specific operation according to the system parameter.

2. The memory management method according to claim 1, wherein the step of determining the system parameter according to the time interval between the first read time point corresponding to the first read operation and the second read time point corresponding to the second read operation comprises:
updating statistical information based on the time interval, wherein the statistical information reflects an average of a plurality of historical time intervals; and
determining the system parameter based on the statistical information.

3. The memory management method according to claim 2, wherein the step of determining the system parameter based on the statistical information comprises:
adjusting a parameter value of the system parameter according to a change of the statistical information.

4. The memory management method according claim 1, wherein the system parameter comprises at least one of a first system parameter and a second system parameter,
the first system parameter is configured to trigger a data scanning operation on the rewritable non-volatile memory module to detect errors in the first physical unit, and
the second system parameter is configured to trigger a data refreshing operation on the rewritable non-volatile memory module to move data from the first physical unit.

5. The memory management method according to claim 1, wherein the step of instructing the rewritable non-volatile memory module to perform the specific operation according to the system parameter comprises:
obtaining a deterioration evaluation parameter related to the rewritable non-volatile memory module, wherein the deterioration evaluation parameter comprises a read count, and the read count reflects the number of times the first physical unit is read;
comparing the deterioration evaluation parameter to the system parameter; and
instructing the rewritable non-volatile memory module to perform the specific operation according to a comparison result.

6. The memory management method according to claim 1, wherein the system parameter comprises a third system parameter, and the third system parameter is configured to affect a decoding mode used by a decoding circuit.

7. A memory storage apparatus, comprising:
a connection interface unit coupled to a host system;
a rewritable non-volatile memory module comprising a plurality of physical units; and
a memory control circuit unit coupled to the connection interface unit and the rewritable non-volatile memory module,
wherein the memory control circuit unit is configured to:
send a plurality of read command sequences comprising a first read command sequence and a second read command sequence, wherein the first read command sequence is configured to instruct a performing of a first read operation on a first physical unit of the plurality of physical units, and the second read command sequence is configured to instruct a performing of a second read operation on the first physical unit;
determine a system parameter according to a time interval between a first read time point corresponding to the first read operation and a second read time point corresponding to the second read operation; and
instruct the rewritable non-volatile memory module to perform a specific operation according to the system parameter.

8. The memory storage apparatus according to claim 7, wherein the step of determining the system parameter according to the time interval between the first read time point corresponding to the first read operation and the second read time point corresponding to the second read operation comprises:
updating statistical information based on the time interval, wherein the statistical information reflects an average of a plurality of historical time intervals; and
determining the system parameter based on the statistical information.

9. The memory storage apparatus according to claim 8, wherein the step of determining the system parameter based on the statistical information comprises:
adjusting a parameter value of the system parameter according to a change of the statistical information.

10. The memory storage apparatus according to claim 7, wherein the system parameter comprises at least one of a first system parameter and a second system parameter,
the first system parameter is configured to trigger a data scanning operation on the rewritable non-volatile memory module to detect errors in the first physical unit, and
the second system parameter is configured to trigger a data refreshing operation on the rewritable non-volatile memory module to move data from the first physical unit.

11. The memory storage apparatus according to claim 7, wherein the step of instructing the rewritable non-volatile memory module to perform the specific operation according to the system parameter comprises:
obtaining a deterioration evaluation parameter related to the rewritable non-volatile memory module, wherein the deterioration evaluation parameter comprises a read count, and the read count reflects the number of times the first physical unit is read;
comparing the deterioration evaluation parameter to the system parameter; and
instructing the rewritable non-volatile memory module to perform the specific operation according to a comparison result.

12. The memory storage apparatus according to claim 7, wherein the system parameter comprises a third system parameter, and the third system parameter is configured to affect a decoding mode used by a decoding circuit.

13. A memory control circuit unit for controlling a rewritable non-volatile memory module, wherein the rewritable non-volatile memory module comprises a plurality of physical units, and the memory control circuit unit comprising:
a host interface coupled to a host system;
a memory interface coupled to the rewritable non-volatile memory module; and
a memory management circuit coupled to the host interface and the memory interface,
wherein the memory management circuit is configured to:

send a plurality of read command sequences comprising a first read command sequence and a second read command sequence, wherein the first read command sequence is configured to instruct a performing of a first read operation on a first physical unit of the plurality of physical units, and the second read command sequence is configured to instruct a performing of a second read operation on the first physical unit;

determine a system parameter according to a time interval between a first read time point corresponding to the first read operation and a second read time point corresponding to the second read operation; and instruct the rewritable non-volatile memory module to perform a specific operation according to the system parameter.

14. The memory control circuit unit according to claim 13, wherein the step of determining the system parameter according to the time interval between the first read time point corresponding to the first read operation and the second read time point corresponding to the second read operation comprises:

updating statistical information based on the time interval, wherein the statistical information reflects an average of a plurality of historical time intervals; and determining the system parameter based on the statistical information.

15. The memory control circuit unit according to claim 14, wherein the step of determining the system parameter based on the statistical information comprises:

adjusting a parameter value of the system parameter according to a change of the statistical information.

16. The memory control circuit unit according to claim 13, wherein the system parameter comprises at least one of a first system parameter and a second system parameter, the first system parameter is configured to trigger a data scanning operation on the rewritable non-volatile memory module to detect errors in the first physical unit, and the second system parameter is configured to trigger a data refreshing operation on the rewritable non-volatile memory module to move data from the first physical unit.

17. The memory control circuit unit according to claim 13, wherein the step of instructing the rewritable non-volatile memory module to perform the specific operation according to the system parameter comprises:

obtaining a deterioration evaluation parameter related to the rewritable non-volatile memory module, wherein the deterioration evaluation parameter comprises a read count, and the read count reflects the number of times the first physical unit is read;

comparing the deterioration evaluation parameter to the system parameter; and instructing the rewritable non-volatile memory module to perform the specific operation according to a comparison result.

18. The memory control circuit unit according to claim 13, wherein the memory control circuit unit further comprises a decoding circuit, the system parameter comprises a third system parameter, and the third system parameter is configured to affect a decoding mode used by the decoding circuit.

* * * * *